United States Patent Office 3,660,352
Patented May 2, 1972

---

3,660,352
HINDERED PHENOL SULFIDE ANTIOXIDANTS FOR POLYMERS
John Song, Bound Brook, N.J., assignor to American Cyanamid Company, Stamford, Conn.
No Drawing. Continuation-in-part of application Ser. No. 705,624, Feb. 15, 1968. This application June 4, 1970, Ser. No. 43,594
Int. Cl. C08c *27/66;* C08f *45/58;* C08g *51/58*
U.S. Cl. 260—45.95
6 Claims

ABSTRACT OF THE DISCLOSURE

Compounds of the type represented by the formula:

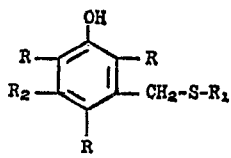

wherein each R is independently a lower alkyl group, $R_1$ is higher alkyl or higher alkylbenzyl, $R_2$ is hydrogen or the group —$CH_2SR_1$, and their use as effective antioxidants for organic materials normally subject to oxidative deterioration, especially polyolefins.

---

This is a continuation-in-part of application No. 705,624, filed Feb. 15, 1968 now abandoned.

This invention relates to the stabilization of organic materials normally subject to oxidative deterioration with a novel class of phenol sulfides. More particularly, it relates to the stabilization of such materials with an effective amount of a phenol sulfide of the type represented by the formula:

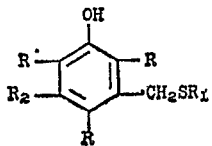

where each R is independently a lower alkyl group; $R_1$ is higher alkyl or higher alkylbenzyl, $R_2$ is hydrogen or the group —$CH_2SR_1$.

It is an object of this invention to provide a method for the stabilization of organic material normally subject to oxidative deterioration. It is a further object of this invention to provide a novel class of phenol sulfides useful for the stabilization of organic material against oxidative deterioration. It is still another object to provide a method for the preparation of the class of phenol sulfides described.

This invention is based on the discovery of a novel class of phenol sulfides in which the sulfide group is oriented meta to a phenolic hydroxyl group and in which the positions ortho and para to the hydroxyl group are completely substituted. It is additionally based on the discovery that these compounds exhibit a high degree of antioxidant activity useful in the protection of oxidizable organic substrates and that the antioxidant protection is provided without any substantial discoloration of the substrate.

The compounds of this invention, as illustrated by Formula I, have an alkylthiomethyl grouping —$CH_2SR_1$ situated in a position meta to the phenolic hydroxyl group. Thus, the said group is not conjugated with the hydroxyl group. This is a critical feature which manifests itself in the high degree of antioxidant protection afforded the substrate. In addition, the compounds of this invention are completely substituted in the positions ortho and para to the phenolic hydroxyl group with lower alkyl groups which may be unbranched radicals such as methyl, ethyl, propyl, butyl, hexyl, cyclohexyl radicals or branched radicals such as an isopropyl or a tertiary butyl group. Moreover, the compounds may be substituted in one or both of the meta positions with the alkylthiomethyl group —$CH_2SR_1$.

It is surprising that the compounds of Formula I are as effective as they are since phenols having alkylthiomethyl groups in the ortho- or para-position generally discolor the substrate upon aging and afford a very low level of antioxidant protection as shown in the accompanying examples.

The phenol sulfides of this invention are non-discoloring and exhibit an unexpected and unusual level of antioxidant protection to organic materials subject to oxidation, especially to polypropylene. This activity is believed to be due to the structural features described above, i.e., meta substitution by one or two alkylthiomethyl groups and complete substitution by alkyl groups of the positions ortho and para to the phenolic hydroxyl group.

The compounds of this invention are prepared by the reaction of an appropriate higher alkyl (i.e., an alkyl with at least eight carbons, especially those of 8–18 carbon atoms) or higher alkylbenzyl mercaptan with a meta-positioned chloromethyl group on a phenol which is completely substituted by lower alkyl groups in all ortho and para positions, in the presence of a basic material. The equivalent phenol esters (e.g., the acetate) may be used in place of the phenol.

The chloromethyl group is introduced into the meta position of the appropriately substituted phenol (or phenol acetate) by reaction with HCl and formaldehyde or methylal in the presence of HCl and $H_2SO_4$, according to the procedure of R. Wegler and E. Regel, Makromol. Chem. 9, 1(1952).

Suitable substituted phenols (or their equivalent acetates) include 2-tert.-butyl - 6 - methyl-p-cresol, 2,4,6-trimethylphenol, 2-methyl - 6 - isopropyl - p - cresol, 2-sec.-butyl - 6 - methyl-p-cresol, 2-cyclohexyl - 6 - methyl-p-cresol.

Suitable higher alkyl or higher alkylbenzyl mercaptans include octyl mercaptan, decyl mercaptan, tetradecyl mercaptan, hexadecyl mercaptan, octadecyl mercaptan, and dodecylbenzyl mercaptan, and the like.

The reaction of the mercaptan with the chloromethyl compound is conducted in the presence of a base and usually in the presence of a solvent. Tertiary amines such as trimethylamine or triethylamine are useful bases. Others include sodium methylate or sodium ethylate. The solvent can be methanol, ethanol, tetrahydrofuran, ether, dimethylformamide and the like.

The reaction temperature and the reaction time are not especially critical. The reaction can be accomplished in the temperature range of from about room temperature to about 100° C. for from about 4 to about 24 hours, depending on the particular compound being synthesized.

In syntheses in which the phenol acetate is used as an intermediate, the final product must be obtained by hydrosis of the acetate. The hydrolytic procedure is not critical and hydrolysis can be accomplished according to any method known to those skilled in the art. For example, the acetate can be hydrolyzed by boiling the compound with an excess of sodium hydroxide in aqueous ethanol.

Isolation of the compound and purification are accomplished by any suitable means such as by filtration, recrystallization, chromatography, and the like.

The compounds of this invention are especially useful as antioxidants for polyolefins (e.g., homopolymers or copolymers of mono α-olfiens of 2–6 carbons) in which they exhibit a high degree of activity and are non-discoloring. The compounds can be similarly used in other organic materials normally subject to oxidative deterioration, including such polymers as ABS resins (acrylonitrile-butadiene-styrene copolymers), the polyamides, polyacetals (e.g., polyformaldehyde), polystyrene, impact polystyrene, natural rubber and the various synthetic rubbers including ethylene-propylene copolymer rubbers, and such other organic materials as oils, fats, greases, gasoline, etc.

The compounds are incorporated into the various substrates according to any of the well known techniques, including milling, Banbury mixing, swelling, stirring, kneading, etc. In polypropylene the compounds can be effectively incorporated by milling on a conventional two roll plastic mill. The compounds are effective as antioxidants over a range of concentration of from about 0.01 to about 5%. In polypropylene they are used preferably at a concentration of from 0.05 to 1%, based on the weight of the substrate.

In the case of polymers, after milling, during which other ingredients such as filler, plasticizers and light absorbers may be added, the polymer composition is compression molded, cast, spun, injection molded or extruded to a shaped article.

The antioxidant activity of the compounds of this invention in polypropylene is greatly enhanced by concurrent use with esters of thiodipropionic acid, well known secondary stabilizers for polypropylene.

Oxidative deterioration of polypropylene and other similar oxidizable plastic materials is evident from the embrittlement which occurs on exposure to atmospheric oxygen. The extent to which the antioxidant protects against deterioration is measured by determining the hours to embrittlement at 140° C.–150° C. when a specimen 15–20 mils in thickness, containing the antioxidant, is exposed in a forced draft oven at this temperature.

The invention is more fully described by the examples which follow.

EXAMPLE 1

6-tert.-butyl-2,4-dimethyl-3-(tetradecylthiomethyl)phenol

A mixture of 11.5 grams (0.05 mole) of 6-tert. butyl-3-chloromethyl-2,4-dimethylphenol, 12.5 grams (0.066 mole) of tetradecylmercaptan, and 12.24 grams (0.12 mole) of trimethylamine in 76 ml. of tetrahydrofuran was heated at 62–71° C. for 11 hours. The mixture was cooled and added to 200 grams of ice. The oil which separated was purified by chromatography on alumina with hexane-chloroform (2:1) as the eluant. The structure was confirmed by elemental analysis (percent S 77.66, theory 7.62), and by infrared an N.M.R. spectroscopy.

EXAMPLE 2

6-tert.-butyl-2,4-dimethyl-3-(octadecylthiomethyl)phenol

A mixture of 6.4 grams (0.024 mole) of 6-tert.-butyl-3-chloromethyl-2,4-dimethylphenol acetate, 6.9 grams (0.024 mole) of octadecylmercaptan, and 1.33 grams (0.024 mole) of sodium methylate (98%) in 45 ml. of methanol was stirred at about room temperature for 18 hours. A mass of crystals formed and was slurried in 20 ml. methanol, filtered, and washed with 20 ml. of aqueous methanol (1:1) to give 12.2 grams of crystalline material, M.P. 35–37° C. The compound was recrystallized twice from ethanol to give an analytically pure sample of 6-tert.-butyl-2,4-dimethyl - 3 - (octadecylthiomethyl)phenol acetate.

The hydrolysis of 5.18 grams (0.01 mole) of the above acetate with 4.28 grams (00.06 mole) of sodium hydroxide in boiling 80% ethanol-water for two hours gave 4.75 grams of 6-tert.-butyl-2,4 - dimethyl - 3 - (octadecythiomethyl)phenol, M.P. 41–43° C.

EXAMPLE 3

3,5-bis(dodecylthiomethyl)-2,4,6-trimethylphenol

A mixture of 2.75 grams (0.01 mole) of 3,5-(dichloromethyl)-2,4,6-trimethylphenol acetate, 4.05 grams (0.02 mole) of dodecylmercaptan, and 1.36 grams (0.02 mole) of sodium ethylate in 124 ml. ethanol was stirred at room temperature of about 6 hours. The crystals which formed were filtered and washed with ethanol, to afford 3.11 grams of 3,5-bis-(dodecylthiomethyl)-2,4,6-trimethylphenol acetate, M.P. 86–88° C. A portion was recrystallized from ethyl acetate to give an analytically pure sample, M.P. 88–89° C.

The hydrolysis of 2.1 grams (0.0033 mole) of the above acetate was carried out with 3.43 grams (0.0856 mole) of sodium hydroxide in 40 ml. of 880% aqueous ethanol at reflux for 2 hours. The mixture was evaporated to 20 ml. and two volumes of water added to afford a slurry of yellow crystals. The crystals were filtered, washed with aqueous ethanol to give 1.86 grams of product, M.P. 622–63° C. A portion was recrystallized from chloroform-methanol (1:2) to give an analytically pure sample of 3,5-bis(dodecylthiomethyl)-2,4,6 - trimethylphenol, M.P. 65–66° C.

EXAMPLE 4

3,5-bis(tetradecylthiomethyl)-2,4,6-trimethylphenol

A mixture of 7 grams (0.03 mole) of 3,5-dichloromethyl-2,4,6-methylphenol, 13.8 grams (0.06 mole) of tetradecylmercaptan, and 9.1 grams (0.09 mole) of trimethylamine in 60 ml. of tetrahydrofuran was kept at 70–72° C. for 8 hours. The cooled mixture was added to 300 grams of ice containing 2.5 ml. (0.03 mole) of conc. hydrochloric acid. The curd-like precipitate was removed, washed with 100 ml. of water, 100 ml. of dilute (10%) sodium bicarbonate solution, and again with 100 ml. of water. Maceration of the precipitate in 100 ml. of aqueous ethanol (95%) gave 10.85 grams of colorless granules, M.P. 62° C. A portion was twice recrystallized from chloroform-methanol (1:2) to give an analytical sample of 3,5 - bis(tetradecylthiomethyl)-2,4,6-trimethylphenol, M.P. 67–68° C.

Similarly prepared were 3,5-bis(octadecylthiomethyl)-2,4,6-trimethylphenol, M.P. 77° C. and 6-tert.-butyl-3-(dodecylbenzylthiomethyl) - 2,4 - dimethylphenol, obtained as a viscous oil, by using octadecylmercaptan in place of tetradecylmercaptan for the former, and dodecylbenzylmercaptan and 6-tert.-butyl-3-chloromethyl-2,4-dimethylphenol for the latter.

EXAMPLE 5

Evaluation of compounds as antioxidants in polypropylene

The following compounds were tested at 0.2% concentration for antioxidant activity in polypropylene. The samples were formed by milling 0.2% by weight of the test compound with unstabilized polypropylene and forming 15–20 mil plaques by compression molding. The plaques containing the compounds were exposed to a temperature of 140° C. in a forced draft oven and the hours to embrittlement were noted. The test compounds with identifying numbers referred to in Table I are as follows:

(1) 6-tert-butyl-2,4-dimethyl-3-(tetradecylthiomethyl)phenol
(2) 6-tert.-butyl-2,4-dimethyl-3-(octadecylthiomethyl)phenol
(3) 3,5-bis(dodecylthiomethyl)-2,4,6-trimethylphenol
(4) 3,5-bis(tetradecylthiomethyl)-2,4,6-trimethylphenol
(5) 3,5-bis(octadecylthiomethyl)-2,4,6-trimethylphenol
(6) 6-tert.-butyl-3-(p-dodecylbenzylthiomethyl)2,4-dimethylphenol
(7) 2,6-di-tert.-butyl-4-(p-nonylphenylthiomethyl)phenol (Compound not of this invention).

TABLE I

| Compound: | Hours to brittle point at 140° C. |
|---|---|
| None | 0–4 |
| Compound 1 | 260–270 |
| Compound 2 | 620–640 |
| Compound 3 | 1180–1200 |
| Compound 4 | 1118–1128 |
| Compound 5 | 1234–1244 |
| Compound 6 | 620–630 |
| Compound 7 | [1]10–15 |

[1] Test sample was yellow at outset of brittle point test.

EXAMPLE 6

In the manner of Example 5, an adidtional set of sample plaques were prepared of 15–20 mils thickness polypropylene containing 0.2% by weight of the following compounds and were exposed, in a forced draft oven at 140° C. until embrittlement. The test compounds with identifying numbers referred to in Table II are as follows:

(1) 6-tert.-butyl-2,4-dimethyl-3-(p-dodecylbenzylthiomethyl)-phenol
(2) 2,6-di-tert.-butyl-4-(p-dodecylbenzylthiomethyl)-phenol (Compound not of this invention).

TABLE II

| Compound: | Hours to brittle point at 140° C. |
|---|---|
| None | 0–4 |
| Compound 1 | 550–560 |
| Compound 2 | 190–210 |

EXAMPLE 7

Evaluation of compounds as antioxidants in ABS

The following formulation were prepared:

1000 grams unstabilized ABS (Marbon)
50 grams TiO$_2$
10 grams zinc stearate
0.5% antioxidant The antioxidants tested were as follows:

(1) 2,4,6-trimethyl-3,5-di(tetradecylthiomethyl)phenol
(2) 2,4,6-trimethyl-3,5-di(dodecylthiomethyl)phenol
(3) 2,4,6-trimethyl-3,5-bis(octadecylthiomethyl)phenol
(4) 2,6-di-tert.-butyl-4-(p-nonylphenylthiomethyl)phenol (Compound not of this invention).

The antioxidants were incorporated by milling on a conventional two roll mill. The milled composition was compression molded into plaques 15–20 mils in thickness and tested by oven aging at 150° C. until embrittlement occurred. The data obtained are shown in Table III.

TABLE III

| Test compound | Oven aging at 150° C. | | | |
|---|---|---|---|---|
| | Hours to brittle point | Initial YI [1] | ΔYI at 2 hrs. | ΔYI at 16 hrs. |
| None | 5 | 12.7 | 11.8 | 44.2 |
| Compound: | | | | |
| 1 | 23 | 10.9 | 5.0 | 15.2 |
| 2 | 23 | 11.3 | 4.6 | 14.9 |
| 3 | 23 | 11.9 | 4.8 | 15.2 |
| 4 [2] | 16 | 17.5 | 8.4 | 20.8 |

[1] Yellow Index determined by ASTM Method D-1925 using a Hunter Color Difference Meter, manufactured by Hunter Associates Laboratory, Inc.
[2] This compound is not within the scope of the present invention.

The above data in Examples 5, 6, and 7 illustrate the effectiveness of the antioxidants of this invention as compared with seemingly analogous compounds.

EXAMPLE 8 o-Tert.-butyl-2,4-dimethyl-3-(octadecylthiomethyl)phenol

A mixture of 33.97 g. (0.15 mole) of 6-tert.-butyl-2,4-dimethyl-3-chloromethylphenol, 42.8 g. (0.15 mole) of octadecylmercaptan, and 30.36 g. (0.30 mole) of triethylamine in 150 ml. of tetrahydrofuran was heated at 45–50° for 15 hours under a nitrogen atmosphere. Triethylamine hydrochloride was collected and the ether solution was diluted with 200 ml. of water. The aqueous solution was extracted with 220 ml. of benzene. The benzene solution was washed with 3×100 ml. dilute brine solution, dried and concentrated to give 65 g. of an oil.

Treatment of the oil in chloroform-methanol (1:3) gave 39.45 g. of tan crystals, M.P. 43°. This material was further purified by chromatography on alumina using hexane-benzene (1:1) mixture followed by a recrystallization from chloroform-methanol (1:3) mixture to obtain 20.3 g. colorless product, M.P. 46–7°.

EXAMPLE 9

2-dodecylthiomethyl-4-methyl-6-tert.-butylphenol

Polypropylene film containing 2% by weight of 2-dodecylthiomethyl-4-methyl-6-tert.-butylphenol was exposed in a circulating air oven at 140° C. Hours to embrittlement were noted. This data is shown below.

| Sample: | Brittle point, hours Oven aging, 140° C. |
|---|---|
| 2 - dodecylthiomethyl-4-methyl - 6 - t - butylphenol (2%) | 10–20 |
| Control (none) | 0–4 |

This sample illustrates the ineffectiveness of compounds wherein the thiomethyl group is situated ortho to the phenolic hydroxyl group.

I claim:
1. A composition of matter comprising (a) an organic material which tends to deteriorate upon exposure to oxygen under normal conditions said organic material being a polymer selected from the group consisting of polyolefins, polyamides, polyacetals and natural rubber and (b) 0.01–5.0 weight percent of a compound of the formula:

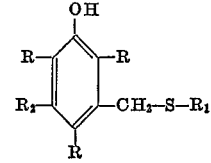

wherein R is lower alkyl, $R_1$ is higher alkyl or higher alkylbenzyl, and $R_2$ is hydrogen or —$CH_2SR_1$.

2. A composition as defined in claim 1 wherein said polymer is a polymer of an alpha mono-olefin or a diolefin polymer.

3. A composition as defined in claim 2 wherein said polymer is an acrylonitrile-butadiene-styrene polymer or polypropylene.

4. A composition as defined in claim 1 wherein $R_1$ is higher alkyl.

5. A composition as defined in claim 4 wherein said polymer is a polymer of an alpha mono-olefin or a diolefin polymer.

6. A composition as defined in claim 5 wherein said polymer is an acrylonitrile-butadiene-styrene polymer or polypropylene.

References Cited

UNITED STATES PATENTS

| 2,322,376 | 6/1943 | McCleary et al. | 252—42.7 |
| 2,976,324 | 3/1961 | Long et al. | 260—609 |
| 3,234,177 | 2/1966 | Schooten | 260—45.95 |
| 3,260,757 | 7/1966 | O'Shea | 260—45.95 |
| 3,457,315 | 7/1969 | Moffatt | 260—609 |

DONALD E. CZAJA, Primary Examiner

V. P. HOKE, Assistant Examiner

U.S. Cl. X.R.

99—163; 252—404, 48.2; 260—609, 666.5, 810, 814

UNITED STATES PATENT OFFICE
CERTIFICATE OF CORRECTION

Patent No. 3,660,352  Dated May 2, 1972

Inventor(s) JOHN SONG

It is certified that error appears in the above-identified patent and that said Letters Patent are hereby corrected as shown below:

Column 4, Example 3, Line 8:  "of" should read -- for --.

Column 4, Example 3, Line 9:  "3.11" should read -- 5.11 --.

Column 4, Example 3, Line 16:  "880%" should read -- 80% --.

Column 5, Example 8, Line 70:  "o-Tert." should read -- 6-Tert. --.

Signed and sealed this 12th day of September 1972.

(SEAL)
Attest:

EDWARD M. FLETCHER, JR.
Attesting Officer

ROBERT GOTTSCHALK
Commissioner of Patents